US009053230B2

(12) United States Patent
Bharadwaj et al.

(10) Patent No.: US 9,053,230 B2
(45) Date of Patent: Jun. 9, 2015

(54) FRAMEWORK AND REPOSITORY FOR ANALYSIS OF SOFTWARE PRODUCTS

(71) Applicant: INTERNATIONAL BUSINESS MACHINES CORPORATION, Armonk, NY (US)

(72) Inventors: Sunil Bharadwaj, Beaverton, OR (US); Wendy L. Henson, Portland, OR (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 98 days.

(21) Appl. No.: 13/741,284

(22) Filed: Jan. 14, 2013

(65) Prior Publication Data

US 2014/0201721 A1 Jul. 17, 2014

(51) Int. Cl.
*G06F 9/44* (2006.01)
*G06F 11/36* (2006.01)

(52) U.S. Cl.
CPC .................................... *G06F 11/362* (2013.01)

(58) Field of Classification Search
CPC .......................................................... G06F 9/44
See application file for complete search history.

(56) References Cited

U.S. PATENT DOCUMENTS

| | | | | |
|---|---|---|---|---|
| 5,121,443 | A * | 6/1992 | Tomlinson | 382/156 |
| 6,123,733 | A * | 9/2000 | Dalton | 703/5 |
| 6,173,291 | B1 * | 1/2001 | Jenevein | 1/1 |
| 6,389,436 | B1 * | 5/2002 | Chakrabarti et al. | 715/229 |
| 7,117,483 | B2 * | 10/2006 | Dorr et al. | 717/124 |
| 7,644,397 | B2 * | 1/2010 | Warren et al. | 717/131 |
| 2005/0192908 | A1 * | 9/2005 | Jorimann et al. | 705/67 |
| 2006/0047697 | A1 * | 3/2006 | Conway et al. | 707/103 R |
| 2008/0114873 | A1 * | 5/2008 | Chakravarty et al. | 709/224 |
| 2008/0270338 | A1 * | 10/2008 | Adams | 706/48 |
| 2010/0332459 | A1 * | 12/2010 | Yanai et al. | 707/674 |
| 2011/0029960 | A1 | 2/2011 | Cimadamore et al. | |
| 2011/0296388 | A1 * | 12/2011 | Rohde et al. | 717/131 |
| 2012/0072423 | A1 | 3/2012 | Morrison et al. | |
| 2012/0185430 | A1 * | 7/2012 | Yao et al. | 707/617 |
| 2012/0266136 | A1 * | 10/2012 | Brown et al. | 717/124 |

OTHER PUBLICATIONS

Fu, Qiang et al., Execution Anomaly Detection in Distributed Systems through Unstructured Log Analysis, Proc. IEEE Int. Conf. Data Min. ICDM, pp. 149-158, ISSN: 15504786, Publication year: 2009.

* cited by examiner

*Primary Examiner* — Chat Do
*Assistant Examiner* — Jae Jeon
(74) *Attorney, Agent, or Firm* — Shimokaji IP

(57) ABSTRACT

Tacit knowledge associated with software development problems may be shared by providing a framework configured to pre-process raw service data of a software product for identification of data elements. Pre-processing operations may be applied to the raw service data to extract data elements. An identified operating problem in the service data may be efficiently analyzed by referring to a repository of stored records that include previously performed user actions when facing the identified operating problem.

18 Claims, 6 Drawing Sheets

FRAMEWORK AND REPOSITORY FOR ANALYSIS OF SOFTWARE PRODUCTS

BACKGROUND

The present invention relates to software troubleshooting, and more specifically, to a framework and repository for analysis of software products.

Software development typically includes debugging and troubleshooting of coding and how data is processed by the product. In some cases, the debugging may occur after a software product is shipped and is in commercial use. To assist with the debugging process, end users may report previously unforeseen issues to the software developer. Conventionally, once a problem with the product is spotted, a developer typically reviews data and attempts to identify the problem or problems causing the issue. The developer may sometimes hazard a guess as to the root of the problem and may commence a series of trial and error approaches to troubleshooting the issue. As may be appreciated, this may lead to unnecessary expenditure of manpower and computing resources.

SUMMARY

According to one embodiment of the present invention, a system comprises an interface and a software-based framework accessible from the interface. The framework may be configurable to analyze at least a portion of service data that was collected for a software product being debugged for operating problems. The system may include a list of primitives in the framework to be applied to the portion of service data that was collected for a software product. The framework may be configured to analyze one or more identified operating problems, including one or more primitives from the list of primitives, by applying runs of software executable pre-processing steps to the portion of the service data collected for the software product being debugged. The runs of pre-processing steps may identify data elements in the portion of the service data collected for the product being debugged. The system may also include a data storage module coupled to the framework. The data storage module may include a repository of data analysis runs performed prior to the portion of service data collected for the software product being debugged. The framework may be configured to receive a keyword input corresponding to one or more identified operating problems provided to the interface. The framework may also be configured to provide one of the data analysis runs from the data storage module including the received keyword input.

According to another embodiment of the present invention, a computer program product for analyzing a software product comprises a computer readable storage medium having computer readable program code. The computer readable program code may be configured to: provide a software-based framework including user defined fields including a list of primitives to be applied to at least a portion of service data collected for the software product being debugged; apply a run of software executable pre-processing steps to the portion of service data collected for the software product being debugged; create a profile including a list of the software executable pre-processing steps used during the run; analyze an operating problem in the software product based on results of the run; and retrieve from a repository, a stored profile corresponding to a run of software executable pre-processing steps performed prior to the portion of service data collected for the software product being debugged. The identified operating problem may correspond to an identifier in the stored profile.

According to yet another embodiment of the present invention, a method comprises receiving a portion of service data collected for a software product for analysis. The portion of service data collected for a software product may be pre-processed to recognize data elements in the portion of service data. The pre-processing may include applying at least one primitive to the portion of service data. The pre-processed portion of service data may be analyzed for an identified operating problem based on results from the applied at least one primitive. A run of software executable programs may be applied to the pre-processed portion of service data to troubleshoot the operating problem. Records of the data elements in the portion of service data, the at least one primitive, and the operating problem may be stored in a repository accessible for retrieval.

DETAILED DESCRIPTION

Figure 1:
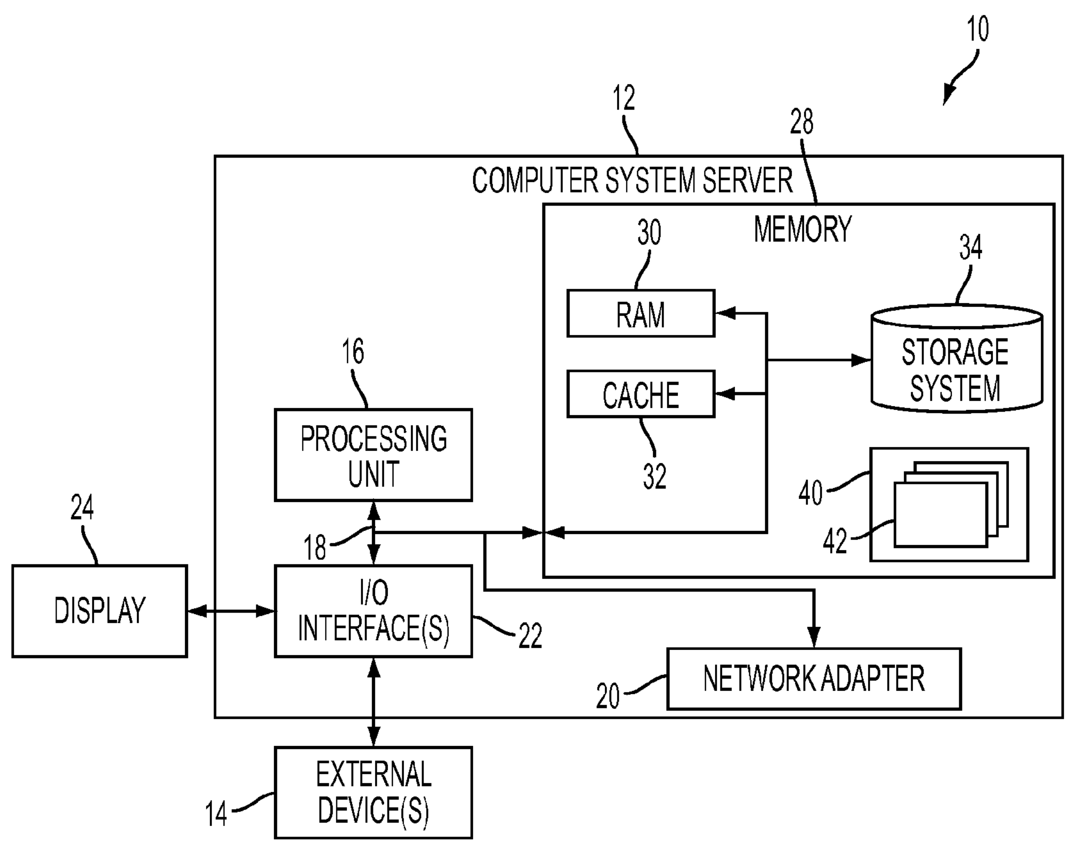
FIG. 1 depicts a cloud computing node according to an embodiment of the present invention.

Embodiments of the subject disclosure generally provide a tool for software analysis and debugging of software products. A software-based framework may pre-process potential sources of error in code and extract data elements from the software product to provide identification of an operating problem(s). The framework may provide stored histories of data analysis corresponding to the same or similar occurrences of the identified operating problem(s). In some embodiments, a recommended profile associated with a stored record of data analysis corresponding to the identified problem may be provided. Thus, knowledge that may be typically tacit or unknown to a user (for example, a software developer) may be exposed aiding in the development and/or troubleshooting of the software product.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus may provide processes for implementing the functions/acts specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth herein.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory or memory module 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system or data storage module 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of the computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
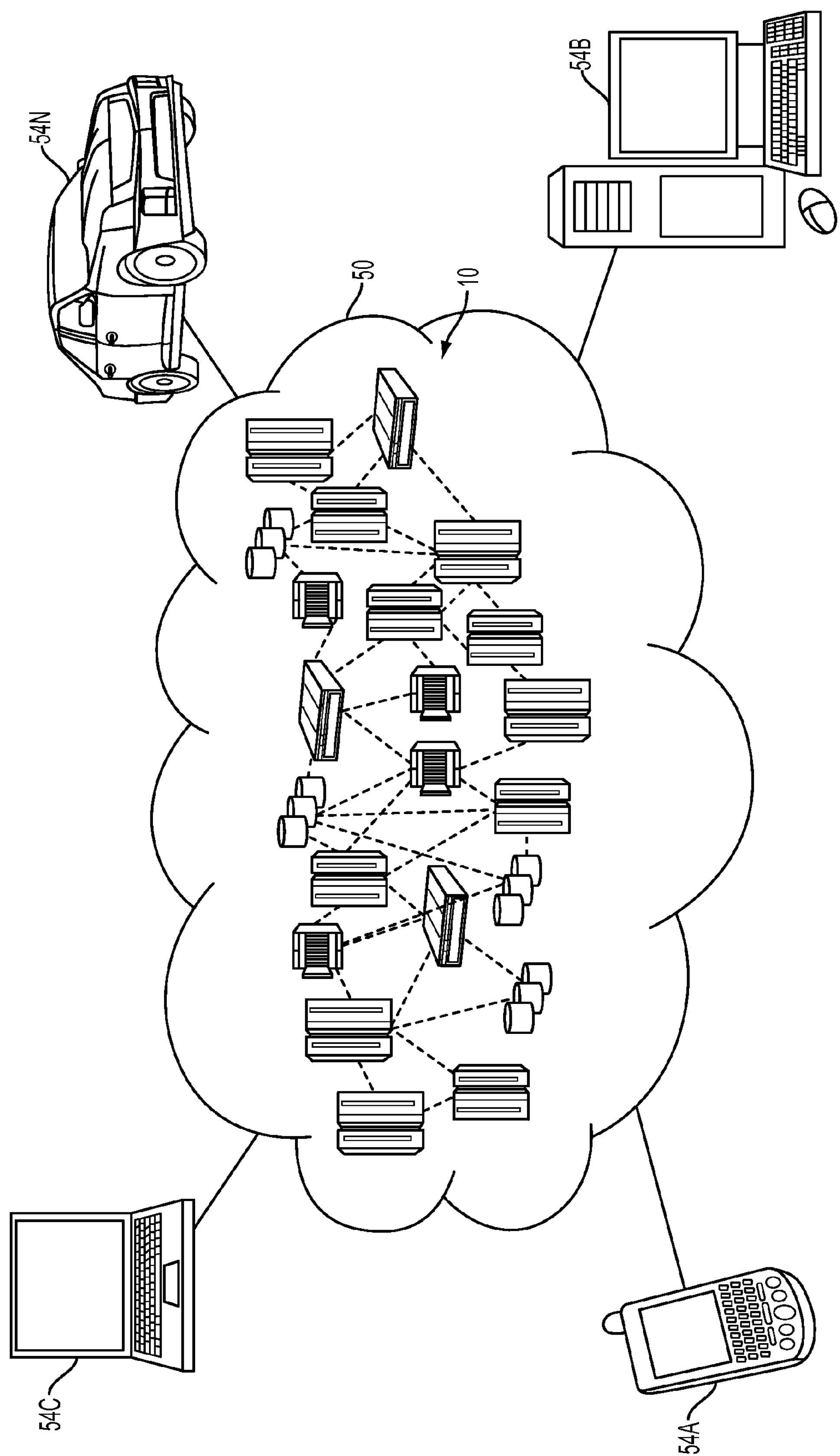
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
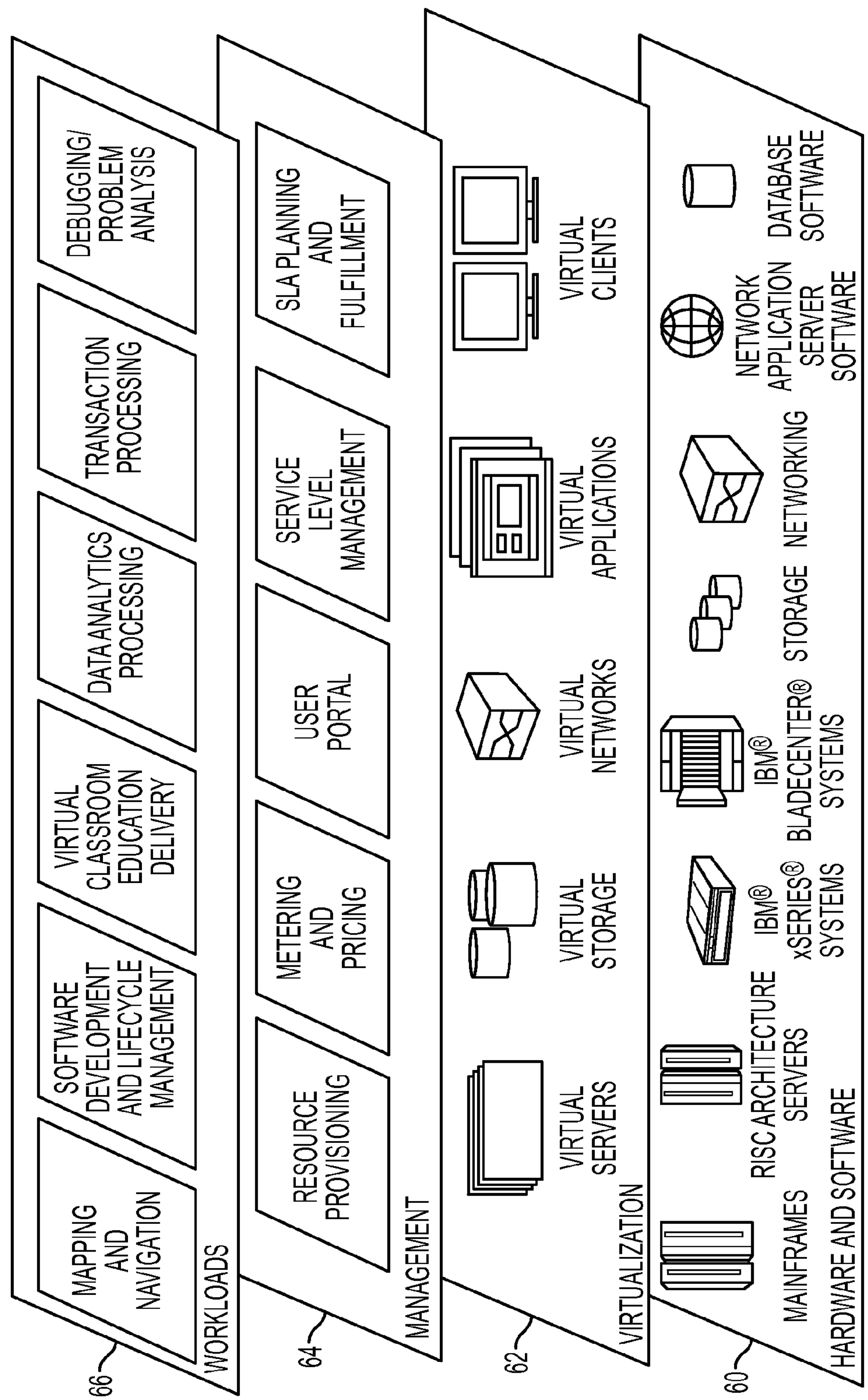
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications; and operating systems; and virtual clients.

In one example, a management layer 64 may provide the functions described below. Resource provisioning may provide dynamic procurement of computing resources and other resources that are utilized to perform tasks within the cloud computing environment. Metering and Pricing may provide cost tracking, as resources are utilized within the cloud computing environment, and may provide billing or invoicing for consumption of these resources. In one example, these resources may comprise application software licenses. Security may provide identity verification for cloud consumers and tasks, as well as protection for data and other resources. A user portal may provide access to the cloud computing environment for consumers and system administrators. Service level management may provide cloud computing resource allocation and management such that required service levels are met. Service Level Agreement (SLA) planning and fulfillment may provide pre-arrangement for, and procurement of, cloud computing resources for which a future requirement is anticipated in accordance with an SLA.

A workloads layer 66 may provide functionality for which the cloud computing environment may be utilized. Examples of workloads and functions that may be provided from this layer include: mapping and navigation; software development and lifecycle management; virtual classroom education delivery; data analytics processing; transaction processing; and data analysis.

Figure 4:
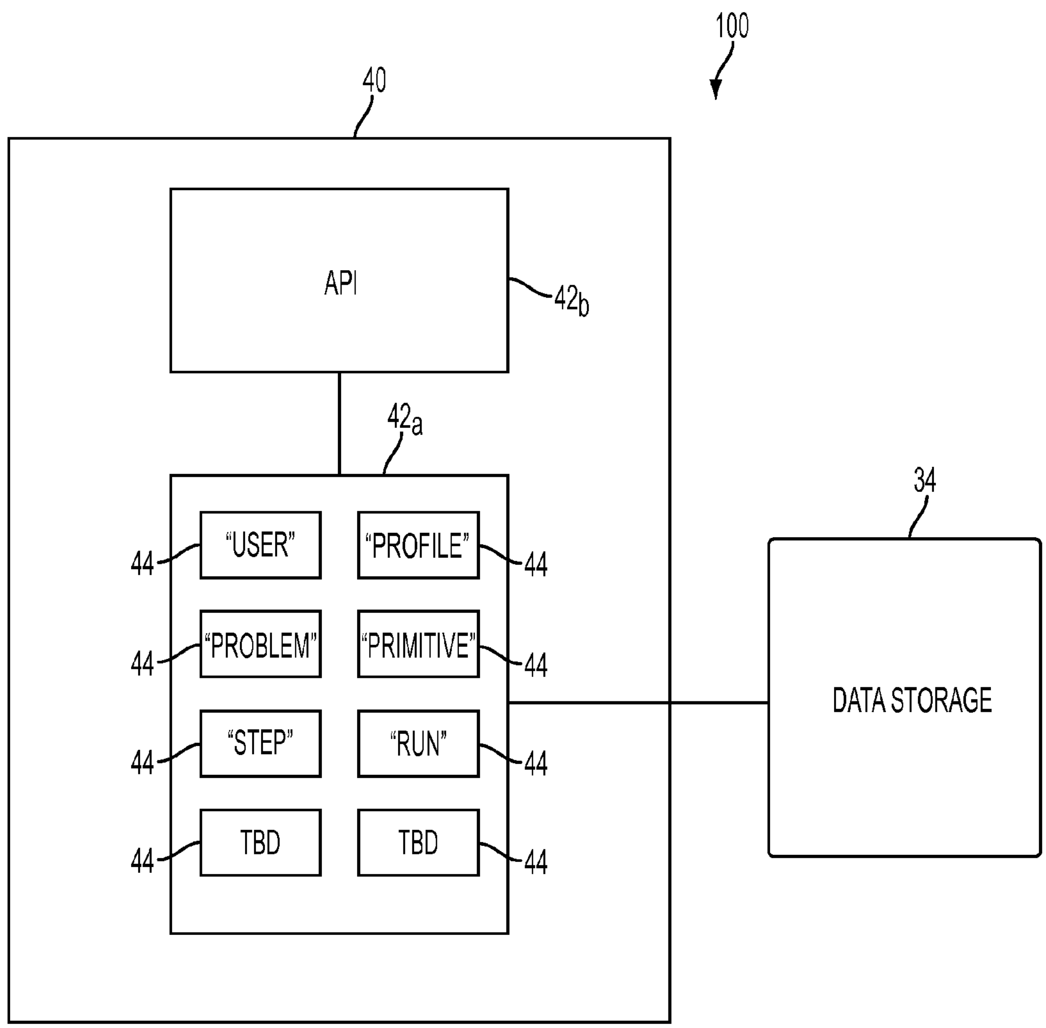
FIG. 4 is a block diagram of a system for pre-processing service data according to yet another embodiment of the present invention.

Referring now to FIG. 4, a system 100 is shown according to an exemplary embodiment of the present invention. The system 100 may include one of the programs 40 configured to pre-process data for storage and retrieval in the data storage module 34. In an exemplary embodiment, the program module 42 (FIG. 1) may include a framework 42*a* configured to analyze at least a portion of raw service data that was collected for a software product being debugged for operating problems. User access to the framework 42*a* may be provided through an application programming interface (API) 42*b*. In an initialization of the framework 42*a*, there may be an option allowing the user to define a plurality of fields 44. The fields 44 may represent data element types to be extracted from a portion of software being analyzed. In an alternative embodiment, the fields 44 may be predetermined in a shipped product.

The fields 44 may include for example, a "user" analyzing an operating problem, a "profile" of sequences of "pre-processing steps" applied to a portion of service data during analysis, an identified operating "problem", a "primitive" applied to a portion of service data, a "step" or operation applied to a portion of service data during an analysis, and a "run" of programs executed on a portion of software during analysis. A primitive may be a software program that implements an operation to perform specific pre-processing of the raw service data. The user (for example, a software developer of the software product) may provide the name of the primitive and the program and specifies them as part of the configuration of the framework 42*a*. A primitive class may be a name of a category that can contain one or more primitives and may serve as a logical grouping for the primitives. A profile may be a sequence of "pre-processing steps" that need to be performed during a pre-processing run. The user may define the profile and may specify it as part of the configuration of the framework 42*a*. A step may define one or more primitives that need to be invoked and the inputs for those primitives. A run may be one invocation of the framework 42*a* that may take the input raw service data and may perform pre-processing of that data into an intermediate format that is in a form more useful for the user to use. The user may specify one or more profiles which may be invoked as part of the run. The "user" field may identify an individual performing problem analysis on the raw service data. The framework 42*a* may associate the user information with an audit trail to share tacit knowledge. For example the audit trail may show the sequence of runs that were performed by a certain user while investigating a problem with a certain keyword and the profiles that were used in that run. Other fields 44 may be defined depending on a strategy employed by the user represented. Other fields not yet defined may be represented by the label "TBD" (to be determined).

The API 42*b* may be configured to operate according to the defined fields 44. The following is a list of exemplary calls and associated exemplary tables using the defined fields 44 that may be used to operate the API 42*b*.

GetIdentifierForProblem—This call may be used to generate a unique identifier for the problem being analyzed. The identifier may be needed to associate runs with a problem. Arguments may include the user identifier and keywords for tagging a problem. The call may return a unique identifier.

GetSuggestedProfilesForProblem—This call may be used to generate a list of profiles that a user may want to use for pre-processing based on input keywords. It may list profiles associated with runs that were executed for problems associated with those keywords.

DefineUser—This call may be used to define a user. The user may be tagged with various entities and may be used for sharing tacit knowledge. Arguments may include a user name and the call may return a unique identifier. Table 1 shows an exemplary setup of defined users within the API 42*b*.

TABLE 1

| Identifier | Name |
|---|---|
| 1 | User1 |
| 2 | User2 |
| 3 | User3 |
| 4 | User4 |

CreateRun—This call may define a pre-processing run. Arguments may include a user identifier, a run name, a problem identifier, some keyword tags to associate with the run and profile identifiers to be used for the run. It may return the unique run identifier. A run may be created according to the example shown in Table 2.

TABLE 2

| Identifier | Run Name | Keyword Tags | Profile Identifiers |
|---|---|---|---|
| 1 | Run1 | "fabric", "information display" | 1, 2 |

UpdateRun—This call updates a run. Arguments may include the user identifier, run identifier and identifiers of profiles to be used for the run GetRun—This call retrieves a run. Arguments may include the run identifier. It returns the attributes of the run.

DeleteRun—This call deletes a run. Arguments may include the user identifier and the run identifier.

ExecuteRun—This call may execute a run that performs pre-processing of service data. Arguments may include the run identifier run and the user identifier of the user specifying the execution of the run.

CreateProfile—This call may create a pre-processing run. Arguments may include the user identifier, the user name, keyword tags to associate with the profile and identifiers of steps to be used for the profile. It may return the unique identifier for the profile.

UpdateProfile—This call may update a profile. Arguments may include the user identifier, the identifier for the profile and identifiers of steps in the profile.

GetProfile—This call may retrieve a profile. An argument may be the profile identifier. It returns the attributes of the specified profile.

DeleteProfile—This call may delete a profile. Arguments may include the user identifier and the profile identifier.

CreateStep—This call may create a pre-processing step. Arguments may include the identifier, the step name and the program name to implement the step. It returns the unique identifier for the profile using the step. Table 3 shows exemplary steps that may be used in the framework 42*a*.

TABLE 3

| Identifier | Step Name | Description |
|---|---|---|
| 1 | GetListOfAgentsMonitoring | Uses RunSQL and RunCommandDataInFile. Data in file specifies the identifier of the fabric and the type of agent (fabric agent) and commands run are SQL. |
| 2 | GetAgentsRegisteredForAutomaticEventNotification | Uses RunCommandDataInFile. The data in the file are identifiers of agents and the command run is FilterDataInFile which checks if there is a line in a log file for the agent with some specific text. |
| 3 | CheckIfFabricEventReceived | Uses FilterDataInFile to find all relevant lines in various files tracing the flow (fabric event received) and MergeFiles to merge output in one file. |

UpdateStep—This call may update a step. Arguments may include the user identifier, the step identifier and the program name to implement the step.

GetStep—This call may retrieve a step. An argument may be the identifier the step identifier. It returns the attributes of the step.

DeleteStep—This call deletes a step. Arguments include the user identifier and the step identifier.

CreatePrimitive—This call may create a pre-processing primitive. Arguments may include the user identifier, the primitive name, the primitive class identifier that the primitive belongs to and a program to implement the primitive. It returns the unique identifier for the primitive. Table 4 shows a list of exemplary primitives that may be used in the framework 42*a*.

TABLE 4

| Identifier | Primitive Name | Description |
|---|---|---|
| 1 | FlattenFiles | Specified files from multiple directories moved to a specified directory. |
| 2 | RunSQL | Run specified SQL |
| 3 | CheckExistenceFile | Check if a file exists in specified directories (absolute, wildcard) |
| 4 | FilterDataInFile | Filter data in files using a specified routine for pattern matching (time range, lines matching keyword, etc.) |
| 5 | RunCommandDataInFile | Run command using data in a file. |

UpdatePrimitive—This call may update a primitive. Arguments may include the user identifier, the primitive identifier, the primitive class to which the primitive belongs to and the program to implement the primitive GetPrimitive—This call may retrieve a primitive. An argument may be the identifier for the primitive. It returns the attributes of the primitive.

DeletePrimitive—This call may delete a primitive. Arguments may include the user identifier, the primitive identifier.

CreatePrimitiveClass—This call may create a pre-processing primitive class. Arguments may include the user identifier and the primitive name. It returns the unique identifier for the primitive class.

GetPrimitiveClass—This call may retrieve a primitive class. An argument may be the primitive class identifier. It returns the attributes of the primitive class.

DeletePrimitiveClass—This call may delete a primitive class. Arguments may include the user identifier and the primitive class identifier.

GetProblems—This call may return a list of identifiers representing unique problems. Arguments for filtering data may include a problem name and a list of keyword tags. An example of a defined problem is shown in Table 5.

TABLE 5

| Identifier | Name | Keyword Tags For Problem |
|---|---|---|
| 1 | Information about a fabric that is been displayed by product is not accurate | "fabric", "information display" |

GetUsers—This call may update a list of identifiers representing unique users. An argument for filtering data may be the user name.

GetRuns—This call may return a list of identifiers representing unique runs. Arguments for filtering data may include a run name, a list of keyword tags, names of profiles, a date, a time range in which the run was executed and a flag indicating whether deleted runs need to be also retrieved.

GetProfiles—This call may return a list of identifiers representing unique profiles. Arguments for filtering data may include a profile name, a list of keyword tags, names of steps and a flag indicating whether deleted profiles need to also be retrieved. Table 6 shows an example of profiles retrieved corresponding to a keyword search.

TABLE 6

| Identifier | Profile Name | Keyword Tags | Step Identifier |
|---|---|---|---|
| 1 | fabric agents configuration | "fabric", "agent configuration" | 1, 2 |
| 2 | fabric event notification | "information display", "fabric", "event notification" | 3 |

GetSteps—This call may return a list of identifiers representing unique steps. Arguments for filtering data may include a step name and a flag indicating whether deleted steps need to also be retrieved.

GetPrimitives—This call may return a list of identifiers representing unique primitives. Arguments for filtering data may include a primitive name, a primitive class and a flag indicating whether deleted primitives need to also be retrieved.

GetPrimitiveClases—This call may return a list of identifiers representing unique primitive classes. Arguments for filtering data may include a class name and a flag indicating whether deleted primitive classes need to also be retrieved.

Figure 4A:
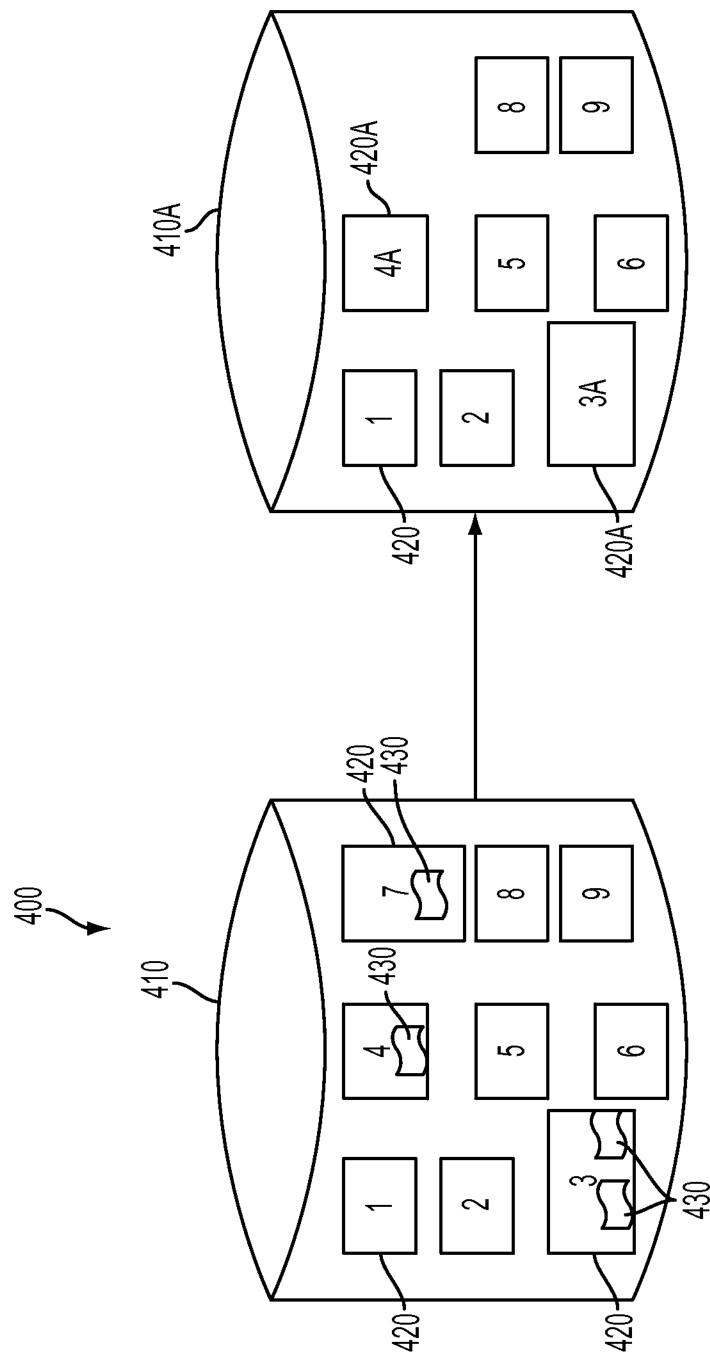
FIG. 4A is a block diagram showing a pre-processing flow of raw service data organized into a repository according to yet another embodiment of the present invention.

Referring now to FIGS. 4 and 4A, a pre-processing flow 400 of raw service data blocks 420 in a repository 410 is shown according to an exemplary embodiment of the present invention. The program module 40 via the framework 42*a* may, in an exemplary embodiment, pre-process the raw service data 410 collected from the end user(s) into an intermediate form of service data 420A that may be used for problem analysis. An intermediate form of service data 420A may be for example, data that corresponds to the fields 44 in the framework 42*a*. For example, the framework 42*a* may be configured to analyze one or more identified operating problems in the raw service data 410 collected. Runs of software executable pre-processing steps may be applied to the raw service data 410 collected for the software product being debugged. The runs of pre-processing steps may identify data elements 430 in the raw service data 420. The data elements 430 may include data corresponding to the fields 44. The identified data elements 430 may be extracted and reorganized so that data elements 430 sharing a common characteristic may be moved into the same directory. For example, data elements 430 in raw service data blocks 420 labeled "4" and "7" may share a common characteristic and may be moved into a common data block 420A labeled "4A". In the raw service data block 420 labeled "3", two data elements 430 may be related to a common profile and may be reorganized in repository 410A to share a modified data block 420A labeled "3A" which may contain other records corresponding to the common profile. The repositories 410 and 410A may be contained within the data storage module 34.

In addition to the pre-processed data, the data storage module 34 may also store records of operations performed on the software being analyzed for an operating problem. For example, records of primitives invoked on the software being debugged, runs executed, audit trails of operations performed, results from the performed operations, and a list of profiles corresponding to a problem analyzed may be stored in the data storage module 34. The records may correspond to a current portion of service data being debugged and to data analysis runs performed prior to the current portion of service data being debugged.

The framework 42*a* may present a summary of extracted data elements 430 to the user through the API 42*b*. The user may review the extracted data and may enable a keyword search function in the API 42*b*. For example, the framework 42*a* may be configured to receive a keyword input corresponding to one or more identified operating problems provided by the user through the API 42*b* and to provide one or more of the stored data analysis runs from the data storage module that includes the received keyword input.

In an exemplary embodiment, the framework 42*a* may be configured to provide one or more suggested profiles corresponding to the results of the keyword search. The user may be provided a readily available display of operations performed corresponding to the profile. For example, the user may request in the keyword search function, a history of records corresponding to an identified operating problem. The framework 42*a* may retrieve and display profiles that involved debugging or troubleshooting the identified operating problem. The framework may display some profiles with a priority over other retrieved profiles based on different factors. For example, profiles that include an indication of a positive end result may be prioritized higher than profiles with an inconclusive result. An audit trail associated to the retrieved profile(s) may be provided. The audit trail may include the identity of a user, the operating problem the user analyzed, the sequence of operations (steps, primitives invoked, and runs executed), and the results of each step. The current user is thus allowed to readily evaluate what previous approaches to debugging may provide productive results and also which approaches may be avoided thus saving time and resources.

In some embodiments, the user may invoke a function in the framework 42*a* to automatically run the currently analyzed portion of service data through the same operations performed in the suggested profile. Thus, the user may be provided a mechanism to compare results between the current data being debugged and a historical record for common sources of error. For example, if the end results of applying the suggested profile to the currently analyzed service data differ from the end results achieved in the suggested profile, the user may compare the two sets of service data for differences. Thus, root sources of error may be more quickly identified.

In some embodiments, the framework 42*a* may be configured to allow the user to override use of the suggested profiles allowing the user to manually select a stored profile. The user may want to manually select stored records because of known characteristics. For example, the user may want to specify retrieval of stored records of another particular user (software developer) who has known experience or success with a type of operating problem. The user may thus implicitly eliminate guesswork during debugging by referring to a reliable source of troubleshooting.

Figure 5:
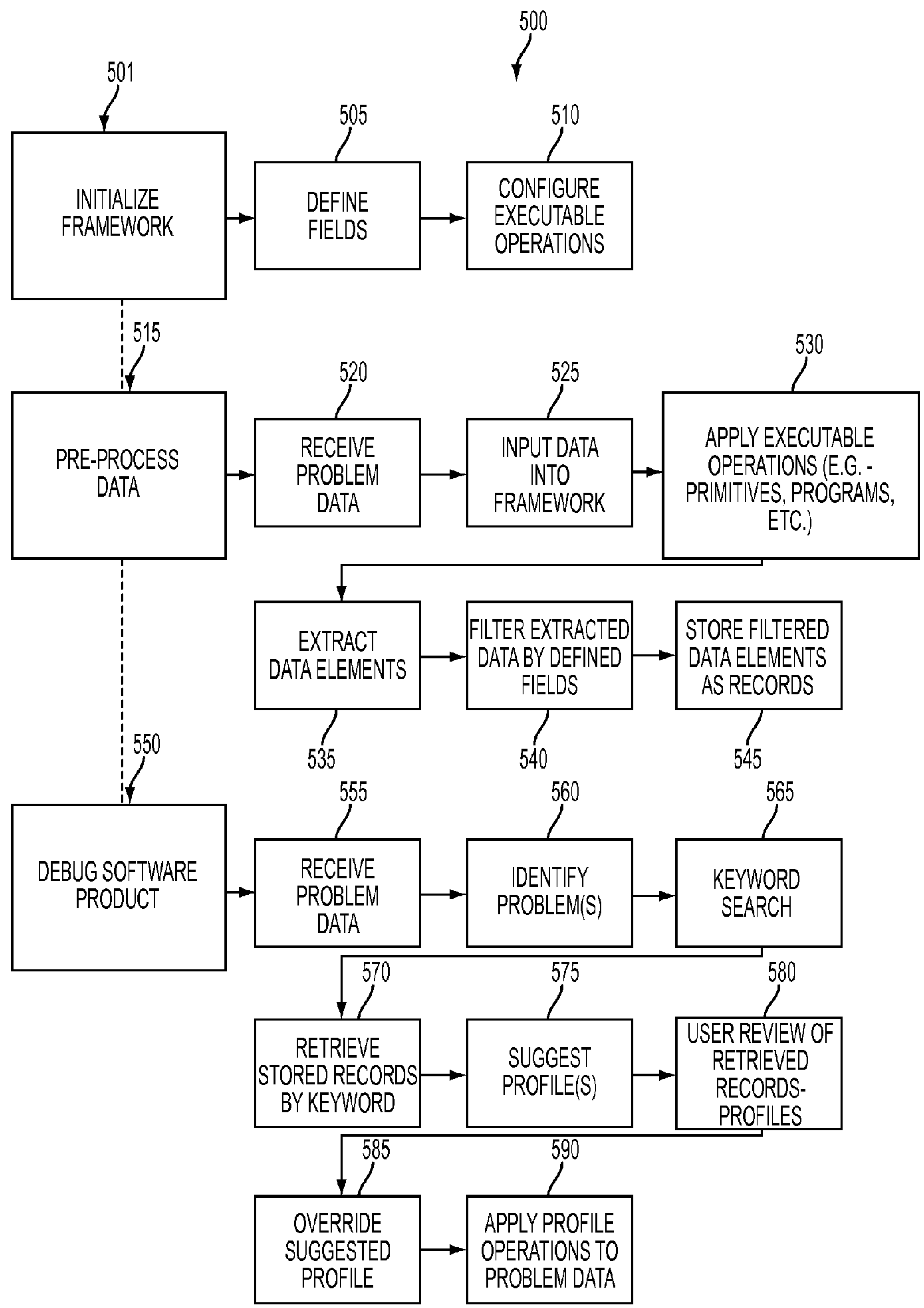
FIG. 5 is a flow chart of a method of debugging a software product according to still another embodiment of the present invention.

Referring now to FIG. 5, a method 500 of debugging a software product is shown according to an exemplary embodiment of the present invention. The method 500 may have three main sections; an initialize framework section 501; a pre-process data section 515; and a debug software product 550. The initialize framework section 501 may be performed during the initial operation of the method 500 and again when the framework 42*a* may be updated. A user may define 505 fields (for example, fields 44) for use in the framework 42*a*. The user may configure 510 executable operations employed during problem analysis of the software product. The executable operations may include for example, calls, primitives, and programs applied to the software product during problem analysis.

The pre-process section 515 may pre-process at least a portion of service data (for example, as described with respect to the framework 42*a* in FIGS. 4 and 4A) collected for a software product to recognize data elements in the service data. For example the framework 42*a* may receive 520 the service data as potential problem data corresponding to the software product. In some embodiments, the service data may be identified by a third party as needing analysis for debugging. The user may input 525 the service data into the framework 42*a*. The user may enable the framework 42*a* to apply 530 executable operations to the service data. For example, one or more primitives may be applied to the service data. The framework 42*a* may extract 535 data elements from the service data after recognizing the effects of the operations on the service data. The framework 42*a* may filter 540 the extracted data elements into the fields 44. For example, the framework 42*a* may identify recognized operating problems from the extracted data elements based on results from the applied primitives. The framework 42*a* may store 545 the filtered data elements as records in a repository. For example, a recognized operating problem and its associated service data may be placed into one or more directories with common attributes.

The debug software product section 550 may provide tacit knowledge to the user by providing previous problem analysis data that corresponds to one or more common attributes of the software product being debugged. For example, the user may input the pre-processed service data into the framework 42*a* (framework 42*a* may receive 555 problem data) and may enable a debugging mode. The user may manually identify 560 one or more operating problems or the framework 42*a* may automatically identify 560 the one or more operating problems. In an exemplary embodiment, the framework 42*a* may provide 565 a keyword search function. The user may manually input a query based on for example, the identified operating problem(s). The framework 42*a* may search the repository and may retrieve 570 stored records corresponding to the keyword search input. In some embodiments, the framework 42*a* may automatically suggest 575 profiles containing records corresponding to the keyword search input. The user may review 580 the retrieved records, for example, retrieved profiles. The user may determine whether the retrieved records contain useful historical data for performing debugging of the pre-processed service data. In embodiments that provide suggested profiles, the user may override 585 the suggested profiles and may specify a record (for example, profiles of a known attribute) for retrieval. The framework 42*a* may apply 590 operations from the profile selected by the user on the pre-processed service data to troubleshoot the operating problem. In some embodiments, an audit trail of the process for troubleshooting the pre-processed service data (for example, records of the pre-processed service data, the primitives and programs applied to the pre-processed service data during troubleshooting, and the identified operating problem) may be stored in the repository which may contribute to further tacit knowledge being available to future data analysis runs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:

an interface;

a processor connected to the interface;

a memory having a software-based framework operated via a processor and accessible from the interface, the framework being configurable to analyze at least a portion of raw service data that was collected for a software product being debugged for software operating problems, wherein at least one primitive of the list of primitives is a software program that implements an operation to perform specific pre-processing of the raw service data as predetermined as a part of a configuration of the software product;

the list of primitives in the framework to be applied to the portion of service data that was collected for a software product, wherein the list of primitives includes at least one of: a FlattenFiles primitive where specified files, from multiple directories, are moved to a specified directory; a RunSQL primitive that runs a specified SQL; a CheckExistenceFile primitive that checks if a file exists in specified directories using an absolute search and/or a wildcard search; a FilterDataInFile primitive that filters data in files using a specified routine for pattern matching using a time range and/or lines matching a keyword; or a RunCommandDataInFile primitive that runs a command using data in a file, and, wherein the framework is configured to analyze one or more identified software operating problems by applying runs of software executable pre-processing steps, including one or more primitives from the list of primitives, to the portion of the service data collected for the software product being debugged, wherein the runs of pre-processing steps identify data elements associated with the one or more identified software operating problems in the portion of the service data collected for the product being debugged and the one or more primitives are configured to process the identified software operating problems; and a data storage module coupled to the framework, the data storage module including a repository of data analysis runs performed prior to the portion of service data collected for the software product being debugged, wherein the framework is configured to:

receive a keyword input corresponding to the one or more identified software operating problems provided to the interface, provide one of the data analysis runs from the data storage module including the received keyword input, create a profile including a list of the pre-processing used during the run, and an identifier associated with an identified software operating problem, analyze the identified software operating problem in the software product based on results of the run, and retrieve from a repository, a stored profile corresponding to a run of software executable pre-processing steps performed prior to the portion of service data collected for the software product being debugged, wherein the retrieved stored profile includes the identified software operating problem and the identifier, and wherein the stored profile includes an identifier of a user of the run of pre-processing performed prior to the portion of raw service data collected for the software product being debugged.

2. The system of claim 1, including a profile of pre-processing steps wherein, the profile includes one or more primitives from the list of primitives to be invoked on the portion of service data collected for the software product being debugged.

3. The system of claim 2, wherein the repository includes a list of profiles used in stored records of data analysis runs.

4. The system of claim 3, wherein the framework is configured to provide a suggested profile from the list of profiles corresponding to the keyword input, wherein the suggested profile includes one of the identified data elements.

5. The system of claim 4, wherein the framework is configured to allow a user to override the suggested profile being provided and to allow the user to specify retrieval of a selected stored profile from the list of profiles.

6. The system of claim 1, wherein the repository includes audit trails of the data analysis runs performed prior to the portion of service data collected for software product being debugged.

7. The system of claim 6, wherein audit trails identify users that performed the data analysis runs.

8. The system of claim 1, wherein the identified data elements correspond to user-defined fields.

9. A computer program product for analyzing a software product, the computer program product comprising a non-transitory computer readable storage medium having computer readable program code embodied therewith, the computer readable program code being configured to:

provide a software-based framework including a list of primitives to be applied to at least a portion of raw service data collected for the software product being debugged, wherein at least one primitive of the list of primitives is a software program that implements an operation to perform specific pre-processing of the raw service data as predetermined as a part of a configuration of the software product, the list of primitives in the framework to be applied to the portion of service data that was collected for a software product, wherein the list of primitives includes at least one of: a FlattenFiles primitive where specified files, from multiple directories, are moved to a specified directory; a RunSQL primitive that runs a specified SQL; a CheckExistenceFile primitive that checks if a file exists in specified directories using an absolute search and/or a wildcard search; a FilterDataInFile primitive that filters data in files using a specified routine for pattern matching using a time range and/or lines matching a keyword; or a RunCommandDataInFile primitive that runs a command using data in a file;

apply a run of software executable pre-processing steps to the portion of service data collected for the software product being debugged;

create a profile including a list of the software executable pre-processing steps used during the run and an identifier associated with an identified software operating problem;

analyze the identified software operating problem in the software product based on results of the run; and retrieve from a repository, a stored profile corresponding to a run of software executable pre-processing steps performed prior to the portion of service data collected for the software product being debugged, wherein the retrieved stored profile includes the identified software operating problem and the identifier, and wherein the stored profile includes an identifier of a user of the run of software executable pre-processing steps performed prior to the portion of raw service data collected for the software product being debugged.

10. The computer program product of claim 9, wherein the computer readable program code is configured to suggest one or more stored profiles corresponding to the identified operating problem being analyzed.

11. The computer program product of claim 9, wherein the stored profile includes a record of operations performed on the identified software operating problem being analyzed.

12. The computer program product of claim 9, wherein the computer readable program code is configured to retrieve from the repository audit trails of data analysis performed by the user.

13. A method, comprising:

receiving a portion of raw service data collected for a software product for analysis;

pre-processing the portion of raw service data collected for a software product to recognize data elements in the portion of raw service data, wherein the pre-processing includes applying at least one primitive implementing a software operation to a software related operating problem associated with the portion of raw service data, and wherein the at least one primitive is predetermined as part of a configuration of the software product, wherein at least one primitive of the list of primitives is a software program that implements an operation to perform specific pre-processing of the raw service data as predetermined as a part of a configuration of the software product, the list of primitives in the framework to be applied to the portion of service data that was collected for a software product, wherein the list of primitives includes at least one of: a FlattenFiles primitive where specified files, from multiple directories, are moved to a specified directory; a RunSQL primitive that runs a specified SQL; a CheckExistenceFile primitive that checks if a file exists in specified directories using an absolute search and/or a wildcard search; a FilterDataInFile primitive that filters data in files using a specified routine for pattern matching using a time range and/or lines matching a keyword; or a RunCommandDataInFile primitive that runs a command using data in a file, and analyzing the pre-processed portion of raw service data for an identified software operating problem based on results from the applied at least one primitive;

applying a run of software executable programs on the pre-processed portion of raw service data to troubleshoot the identified software operating problem;

storing records of the data elements in the portion of raw service data, the at least one primitive, and the identified software operating problem in a repository accessible for retrieval;

creating a profile including a list of the pre-processing used during the run and an identifier associated with an identified software operating problem;

analyzing the identified software operating problem in the software product based on results of the run;

retrieving from a repository, a stored profile corresponding to a run of software executable pre-processing steps performed prior to the portion of service data collected for the software product being debugged, wherein the retrieved stored profile includes the identified software operating problem and the identifier, and wherein the stored profile includes an identifier of a user of the run of software executable pre-processing steps performed prior to the portion of raw service data collected for the software product being debugged.

14. The method of claim 13, wherein the data elements in the portion of service data, the at least one primitive, and the identified software operating problem are stored in a profile retrievable by a keyword eligible identifier.

15. The method of claim 14, including retrieving a suggested stored profile corresponding to an analyzed portion of service data analyzed prior to the pre-processed portion of service data, wherein the prior analyzed portion of software data was analyzed for the identified software operating problem.

16. The method of claim 13, including storing an audit trail of the applied run in the repository.

17. The method of claim 13, including retrieving a stored audit trail corresponding to a stored applied run performed in analyzing the identified software operating problem for a prior analyzed portion of service data.

18. The method of claim 17, wherein the stored audit trail shows a sequence of user actions performed in analyzing the identified software operating problem for the prior analyzed portion of service data.

* * * * *